No. 868,124. PATENTED OCT. 15, 1907.
G. L. RAYMOND.
EGG BEATER.
APPLICATION FILED JAN. 18, 1906.
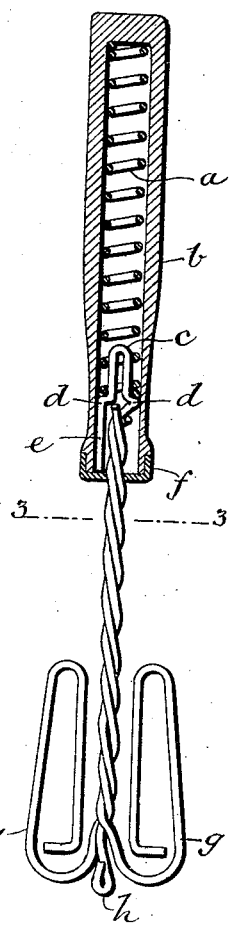
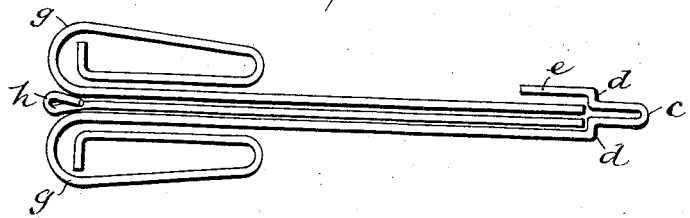

UNITED STATES PATENT OFFICE.

GEORGE L. RAYMOND, OF BINGHAMTON, NEW YORK.

EGG-BEATER.

No. 868,124.  Specification of Letters Patent.  Patented Oct. 15, 1907.

Application filed January 18, 1906. Serial No. 296,648.

*To whom it may concern:*

Be it known that I, GEORGE L. RAYMOND, residing at 13 Bevier street, in the city of Binghamton, county of Broome, State of New York, have invented a new and useful Improvement in Egg-Beaters, of which the following is a specification.

My invention relates to an implement to be used for beating eggs or for the mixing of various ingredients. The object of my invention being to provide a practical and durable beater that can be manufactured more economically and cheaply than those already in use.

I am aware that various egg beaters to which the necessary rotary motion is imparted by a spiral screw are already in use, but in my improved implement, I have endeavored to so simplify the parts and construction as to enable me to produce an egg beater at a minimum of cost of those already in use.

With these objects in view, my improvement consists in the combination and arrangement of the various parts embodied in the details of construction, as hereinafter particularly described and claimed.

Referring to the drawings, Figure 1 represents a sectional view of my egg beater, in which the spiral spring "a" inserted in the hollow handle "b" incloses the loop "c" and rests upon the shoulders "d" "d", while the extension "e" rests upon the ferrule "f", under pressure of the spiral spring "a". Fig. 2 represents the three wires from which the sprial is formed when they have been shaped to form the loop "c" and extension "e", the wings of the egg beater "g" "g" and pivot "h"

Fig. 3 shows the trifurcated ferrule "f", which is used for imparting the necessary rotary motion to the spirally formed wires, which have already been bent to form the wings "g" "g" and the pivot "h".

It will be noted in Fig. 2 that the three wires are bent to form the pivot and wings only, while in Fig. 1 the three wires are twisted together to form a spiral, which spiral is guided and rotated in the trifurcated ferrule and by means of pressure downward given by the hand and the return pressure upward imparted by the spiral within the handle, as shown in Fig. 1, is made to rotate. By forming the implement in this manner, it can be much more cheaply constructed than the egg beaters already in use.

I am aware that egg beaters are already used in which the rotary movement is imparted by a spiral, but the construction of such implements is much more complicated and expensive than the construction of my egg beater, in which every essential element is secured by the three wires, forming a spiral, inserted in a handle, capped with a trifurcated ferrule, and within which handle is inclosed a spiral spring.

What I claim is:

The combination of three wires to form the wings, pivot and spiral of an egg beater, and the inclosing of the spiral portion of said wires when so formed within a handle, the upper part of which handle contains a spiral spring, and the lower part of which is capped by a trifurcated ferrule.

GEORGE L. RAYMOND.

Witnesses:
 D. A. MILLARD,
 M. L. RAYMOND.